US 7,595,280 B2

(12) United States Patent
Welton et al.

(10) Patent No.: US 7,595,280 B2
(45) Date of Patent: *Sep. 29, 2009

(54) DELAYED TACKIFYING COMPOSITIONS AND ASSOCIATED METHODS INVOLVING CONTROLLING PARTICULATE MIGRATION

(75) Inventors: Thomas D. Welton, Duncan, OK (US); David McMechan, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 601 days.

This patent is subject to a terminal disclaimer.

(21) Appl. No.: 11/205,333

(22) Filed: Aug. 16, 2005

(65) Prior Publication Data
US 2007/0042912 A1    Feb. 22, 2007

(51) Int. Cl.
*C09K 8/68* (2006.01)
(52) U.S. Cl. .................................. 507/203; 166/305.1
(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | |
| 2,823,753 A | 2/1958 | Henderson et al. | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,749,172 A * | 7/1973 | Hessert et al. | 166/400 |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice | |
| 3,960,736 A | 6/1976 | Free et al. | |
| 3,968,840 A | 7/1976 | Tate | |
| 3,986,355 A | 10/1976 | Klaeger | |
| 3,998,272 A | 12/1976 | Maly | |
| 3,998,744 A | 12/1976 | Arnold et al. | |
| 4,010,071 A | 3/1977 | Colegrove | |
| 4,068,718 A | 1/1978 | Cooke, Jr. et al. | |
| 4,169,798 A | 10/1979 | DeMartino | |
| 4,172,066 A | 10/1979 | Zweigle et al. | |
| 4,261,421 A | 4/1981 | Watanabe | |
| 4,265,673 A | 5/1981 | Pace et al. | |
| 4,267,887 A | 5/1981 | Watanabe | |
| 4,299,825 A | 11/1981 | Lee | |
| 4,387,769 A | 6/1983 | Erbstoesser et al. | |
| 4,460,052 A | 7/1984 | Gockel | |
| 4,470,915 A | 9/1984 | Conway | |
| 4,498,995 A | 2/1985 | Gockel | |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | |
| 4,632,876 A | 12/1986 | Laird et al. | |
| 4,670,501 A | 6/1987 | Dymond et al. | 524/458 |
| 4,694,905 A | 9/1987 | Armbruster | |
| 4,715,967 A | 12/1987 | Bellis | |
| 4,716,964 A | 1/1988 | Erbstoesser et al. | |
| 4,767,706 A | 8/1988 | Levesque | |
| 4,772,346 A | 9/1988 | Anderson et al. | |
| 4,785,884 A | 11/1988 | Armbruster | |
| 4,793,416 A | 12/1988 | Mitchell | |
| 4,797,262 A | 1/1989 | Dewitz | |
| 4,809,783 A | 3/1989 | Hollenbeck et al. | |
| 4,817,721 A | 4/1989 | Pober | |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |

(Continued)

FOREIGN PATENT DOCUMENTS

EP    1 413 710    4/2004

(Continued)

OTHER PUBLICATIONS

Office Action from U.S. Appl. No. 11/009,296, filed Mar. 5, 2008.

(Continued)

*Primary Examiner*—Randy Gulakowski
*Assistant Examiner*—Alicia M Toscano
(74) *Attorney, Agent, or Firm*—Robert A. Kent; Baker Botts L.L.P.

(57) ABSTRACT

Delayed tackifying compositions are provided for reducing particulate migration in subterranean formations, the compositions comprising an aqueous tackifying agent and a delayed-acid releasing activator.

12 Claims, No Drawings

U.S. PATENT DOCUMENTS

| | | | |
|---|---|---|---|
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,627 A | 10/1993 | Harms et al. | 166/308 |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawton et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck | |
| 5,616,315 A * | 4/1997 | Masterman et al. | 424/54 |
| 5,670,473 A | 9/1997 | Scepanski | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Normal et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,888,944 A | 3/1999 | Patel | |
| 5,893,416 A | 4/1999 | Read | |
| 5,908,073 A | 6/1999 | Nguyen et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,242,390 B1 | 6/2001 | Mitchell et al. | |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 * | 5/2002 | Moradi-Araghi et al. | 523/211 |
| 6,390,195 B1 | 5/2002 | Nguyen et al. | |
| 6,394,185 B1 | 5/2002 | Constien | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,091 B1 | 12/2002 | Weaver et al. | 166/300 |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,599,863 B1 | 7/2003 | Palmer et al. | |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,702,023 B1 | 3/2004 | Harris et al. | |
| 6,710,019 B1 | 3/2004 | Sawdon et al. | |
| 6,716,797 B2 | 4/2004 | Brookey | |
| 6,737,385 B2 | 5/2004 | Todd et al. | |
| 6,742,590 B1 | 6/2004 | Nguyen et al. | |
| 6,761,218 B2 | 7/2004 | Nguyen et al. | |
| 6,763,888 B1 | 7/2004 | Harris et al. | |
| 6,764,981 B1 | 7/2004 | Eoff et al. | |
| 6,780,804 B2 | 8/2004 | Webber et al. | |
| 6,793,018 B2 | 9/2004 | Dawson et al. | |
| 6,793,730 B2 | 9/2004 | Reddy et al. | |
| 6,806,235 B1 | 10/2004 | Mueller et al. | |
| 6,817,414 B2 | 11/2004 | Lee | |
| 6,818,594 B1 | 11/2004 | Freeman et al. | |
| 6,837,309 B2 | 1/2005 | Boney et al. | |
| 6,840,318 B2 | 1/2005 | Lee et al. | |
| 6,852,173 B2 | 2/2005 | Banerjee et al. | |
| 6,861,394 B2 | 3/2005 | Ballard et al. | |
| 6,877,563 B2 | 4/2005 | Todd et al. | |

| | | | |
|---|---|---|---|
| 6,883,608 B2 | 4/2005 | Parlar et al. | |
| 6,886,635 B2 | 5/2005 | Hossaini et al. | |
| 6,896,058 B2 | 5/2005 | Munoz, Jr. et al. | |
| 6,904,971 B2 | 6/2005 | Brothers et al. | |
| 6,949,491 B2 | 9/2005 | Cooke, Jr. | |
| 6,959,767 B2 | 11/2005 | Horton et al. | |
| 6,978,838 B2 | 12/2005 | Parlar et al. | |
| 6,981,552 B2 | 1/2006 | Reddy et al. | |
| 6,983,801 B2 | 1/2006 | Dawson et al. | |
| 6,987,083 B2 | 1/2006 | Phillippi et al. | |
| 6,997,259 B2 | 2/2006 | Nguyen | |
| 7,000,701 B2 | 2/2006 | Todd et al. | |
| 7,007,752 B2 | 3/2006 | Reddy et al. | |
| 7,021,377 B2 | 4/2006 | Todd et al. | |
| 7,032,663 B2 | 4/2006 | Nguyen | |
| 7,036,586 B2 | 5/2006 | Roddy et al. | |
| 7,036,587 B2 | 5/2006 | Munoz, Jr. et al. | |
| 7,040,403 B2 | 5/2006 | Nguyen et al. | |
| 7,044,220 B2 | 5/2006 | Nguyen et al. | |
| 7,044,224 B2 | 5/2006 | Nguyen | |
| 7,049,272 B2 | 5/2006 | Sinclair et al. | |
| 7,063,151 B2 | 6/2006 | Nguyen et al. | |
| 7,066,258 B2 | 6/2006 | Justus et al. | |
| 7,066,260 B2 | 6/2006 | Sullivan et al. | |
| 7,069,994 B2 | 7/2006 | Cooke, Jr. | |
| 7,080,688 B2 | 7/2006 | Todd et al. | |
| 7,093,658 B2 | 8/2006 | Chatterji et al. | |
| 7,093,664 B2 | 8/2006 | Todd et al. | |
| 7,096,947 B2 | 8/2006 | Todd et al. | |
| 7,101,829 B2 | 9/2006 | Guichard et al. | |
| 7,131,491 B2 * | 11/2006 | Blauch et al. | 166/276 |
| 7,132,389 B2 | 11/2006 | Lee | |
| 7,140,438 B2 | 11/2006 | Frost et al. | |
| 7,147,067 B2 | 12/2006 | Getzalf et al. | |
| 7,151,077 B2 | 12/2006 | Prud'homme et al. | |
| 7,153,902 B2 | 12/2006 | Altes et al. | |
| 7,156,174 B2 | 1/2007 | Roddy et al. | |
| 7,165,617 B2 | 1/2007 | Lord et al. | |
| 7,166,560 B2 | 1/2007 | Still et al. | |
| 7,168,489 B2 | 1/2007 | Frost et al. | |
| 7,172,022 B2 | 2/2007 | Reddy et al. | |
| 7,178,596 B2 * | 2/2007 | Blauch et al. | 166/280.2 |
| 7,195,068 B2 | 3/2007 | Todd | |
| 7,204,311 B2 * | 4/2007 | Welton et al. | 166/295 |
| 7,204,312 B2 | 4/2007 | Roddy et al. | |
| 7,205,264 B2 | 4/2007 | Boles | |
| 7,216,705 B2 | 5/2007 | Saini et al. | |
| 7,219,731 B2 | 5/2007 | Sullivan | |
| 7,228,904 B2 | 6/2007 | Todd et al. | |
| 7,261,156 B2 * | 8/2007 | Nguyen et al. | 166/276 |
| 7,261,157 B2 * | 8/2007 | Nguyen et al. | 166/278 |
| 7,264,051 B2 * | 9/2007 | Nguyen et al. | 166/276 |
| 7,265,079 B2 | 9/2007 | Wilbert et al. | |
| 7,267,170 B2 | 9/2007 | Mang et al. | |
| 7,276,466 B2 | 10/2007 | Todd et al. | |
| 7,299,869 B2 | 11/2007 | Kalman | |
| 7,299,876 B2 | 11/2007 | Lord et al. | |
| 7,303,014 B2 | 12/2007 | Reddy et al. | |
| 7,306,037 B2 | 12/2007 | Nguyen et al. | |
| 7,308,939 B2 * | 12/2007 | Welton et al. | 166/280.2 |
| 7,322,412 B2 | 1/2008 | Badalamenti et al. | |
| 7,353,876 B2 | 4/2008 | Savery et al. | |
| 7,353,879 B2 | 4/2008 | Todd et al. | |
| 7,413,017 B2 | 8/2008 | Nguyen et al. | |
| 7,448,450 B2 | 11/2008 | Luke et al. | |
| 7,455,112 B2 | 11/2008 | Moorehead et al. | |
| 7,461,697 B2 | 12/2008 | Todd et al. | |
| 7,475,728 B2 | 1/2009 | Pauls et al. | |
| 7,484,564 B2 | 2/2009 | Welton et al. | |
| 7,497,258 B2 | 3/2009 | Savery et al. | |
| 7,497,278 B2 | 3/2009 | Schriener et al. | |
| 7,506,689 B2 | 3/2009 | Surjaatmadja et al. | |
| 2001/0016562 A1 | 8/2001 | Muir et al. | |
| 2002/0119169 A1 | 8/2002 | Angel et al. | |
| 2003/0054962 A1 | 3/2003 | England et al. | |
| 2003/0130133 A1 | 7/2003 | Vollmer | |
| 2003/0147965 A1 | 8/2003 | Basset et al. | |
| 2003/0230407 A1 | 12/2003 | Vijn et al. | |
| 2004/0014606 A1 | 1/2004 | Parlar et al. | |
| 2004/0070093 A1 | 4/2004 | Mathiowitz et al. | |
| 2004/0099416 A1 | 5/2004 | Vijn et al. | |
| 2004/0138068 A1 | 7/2004 | Rimmer et al. | |
| 2004/0138070 A1 * | 7/2004 | Jones et al. | 507/112 |
| 2004/0152601 A1 | 8/2004 | Still et al. | |
| 2004/0170836 A1 | 9/2004 | Bond et al. | |
| 2004/0231845 A1 | 11/2004 | Cooke, Jr. | |
| 2004/0259738 A1 | 12/2004 | Patel | |
| 2005/0028976 A1 | 2/2005 | Nguyen | |
| 2005/0034861 A1 | 2/2005 | Saini et al. | |
| 2005/0059556 A1 | 3/2005 | Munoz, Jr. et al. | |
| 2005/0059557 A1 | 3/2005 | Todd et al. | |
| 2005/0059558 A1 | 3/2005 | Blauch et al. | |
| 2005/0126785 A1 | 6/2005 | Todd et al. | |
| 2005/0130848 A1 | 6/2005 | Todd et al. | |
| 2005/0183741 A1 | 8/2005 | Surjaatmadja et al. | |
| 2005/0205266 A1 | 9/2005 | Todd et al. | |
| 2005/0272613 A1 | 12/2005 | Cooke, Jr. | |
| 2005/0277554 A1 * | 12/2005 | Blauch et al. | 507/224 |
| 2006/0016596 A1 | 1/2006 | Pauls et al. | |
| 2006/0032633 A1 | 2/2006 | Nguyen | |
| 2006/0046938 A1 | 3/2006 | Harris et al. | |
| 2006/0065397 A1 | 3/2006 | Nguyen et al. | |
| 2006/0105917 A1 | 5/2006 | Munoz, Jr. et al. | |
| 2006/0105918 A1 | 5/2006 | Munoz, Jr. et al. | |
| 2006/0118300 A1 * | 6/2006 | Welton et al. | 166/276 |
| 2006/0118301 A1 | 6/2006 | East et al. | |
| 2006/0169182 A1 | 8/2006 | Todd et al. | |
| 2006/0169448 A1 | 8/2006 | Savery et al. | |
| 2006/0169450 A1 | 8/2006 | Mang et al. | |
| 2006/0169452 A1 | 8/2006 | Savery et al. | |
| 2006/0169453 A1 | 8/2006 | Savery et al. | |
| 2006/0172893 A1 | 8/2006 | Todd et al. | |
| 2006/0172894 A1 | 8/2006 | Mang et al. | |
| 2006/0172895 A1 | 8/2006 | Mang et al. | |
| 2006/0185848 A1 | 8/2006 | Surjaatmadja et al. | |
| 2006/0204756 A1 * | 9/2006 | Welton et al. | 428/407 |
| 2006/0205608 A1 | 9/2006 | Todd | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0258543 A1 | 11/2006 | Saini | |
| 2006/0258544 A1 | 11/2006 | Saini | |
| 2006/0276345 A1 | 12/2006 | Todd et al. | |
| 2007/0039733 A1 * | 2/2007 | Welton et al. | 166/276 |
| 2007/0049501 A1 | 3/2007 | Saini et al. | |
| 2007/0066492 A1 | 3/2007 | Funkhouser et al. | |
| 2007/0066493 A1 | 3/2007 | Funkhouser et al. | |
| 2007/0078063 A1 | 4/2007 | Munoz, Jr. | |
| 2007/0078064 A1 | 4/2007 | Munoz et al. | |
| 2007/0238623 A1 | 10/2007 | Saini et al. | |
| 2007/0281868 A1 | 12/2007 | Pauls et al. | |
| 2007/0298977 A1 | 12/2007 | Mang et al. | |
| 2008/0009423 A1 | 1/2008 | Mang et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |
| 2009/0062157 A1 | 3/2009 | Munoz et al. | |

FOREIGN PATENT DOCUMENTS

| | | |
|---|---|---|
| JP | 2004181820 A | 2/2004 |
| WO | WO 93/15127 | 8/1993 |

| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 00/57022 | 9/2000 |
| WO | WO 01/02698 | 1/2001 |
| WO | WO 01/87797 | 11/2001 |
| WO | WO 01/94744 | 12/2001 |
| WO | WO 02/55843 | 1/2002 |
| WO | WO 02/12674 | 2/2002 |
| WO | WO 03/027431 | 4/2003 |
| WO | WO 2004/007905 | 1/2004 |
| WO | WO 2004/037946 | 5/2004 |

OTHER PUBLICATIONS

Office Action from U.S. Appl. No. 11/009,296, filed Jul. 16, 2007.
Office Action from U.S. Appl. No. 11/205,332, filed Jan. 17, 2008.
Office Action from U.S. Appl. No. 11/205,332, filed Jul. 20, 2007.
U.S. Appl. No. 10/864,061, filed Jun. 9, 2004, Blauch.
U.S. Appl. No. 10/864,618, filed Jun. 9, 2004, Blauch.
U.S. Appl. No. 11/009,277, filed Dec. 8, 2004, Welton, et al.
U.S. Appl. No. 10/947,427, filed Sep. 20, 2004, Blauch, et al.
U.S. Appl. No. 11/009,293, filed Dec. 8, 2004, Welton, et al.
U.S. Appl. No. 11/009,296, filed Dec. 8, 2004, Welton, et al.
Heller, et al., "Poly(ortho esters)—From Concept to Reality," Am. Chem. Soc., vol. 5, No. 5 (pp. 1625-1632), Sep./Oct. 2004.
NatureWorks Product Bulletin entitled NatureWorks PLA Polymer 3001D, Injection Molding Process Guide, 2005.
NatureWorks Product Bulletin entitled Nature Works PLA Polymer 4060D, For Heat Seal Layer in Coextruded Oriented Films, 2005.
NatureWorks article entitled NatureWorks, Crystallizing and Drying of PLA, 2005.
Notice of Allowance dated Jun. 2, 2008 from U.S. Appl. No. 11/205,332.
Notice of Allowance and Notice of Allowability from U.S. Appl. No. 11/205,332, dated Oct. 29, 2008.
Morrison, Robert Thornton, et al. Organic Chemistry, Sixth Edition, Prentice Hall, Englewood Cliffs, New Jersey 07632, 1992, pp. 764, 765.
Office Action for U.S. Appl. No. 11/009,296, dated Mar. 5, 2008.
Office Action for U.S. Appl. No. 11/009,296, dated Jul. 16, 2007.
Office Action for U.S. Appl. No. 11/205,332, dated Jan. 17, 2008.
Office Action for U.S. Appl. No. 11/205,332, dated Jul. 20, 2007.

* cited by examiner

US 7,595,280 B2

DELAYED TACKIFYING COMPOSITIONS AND ASSOCIATED METHODS INVOLVING CONTROLLING PARTICULATE MIGRATION

CROSS-REFERENCE TO RELATED APPLICATIONS

This application is related to application Ser. No. 11/205,332 filed on the same day herewith.

BACKGROUND OF THE INVENTION

The present invention relates to methods and compositions for consolidating formation fines, reducing proppant flowback, and consolidating relatively unconsolidated portions in a subterranean formation (referred to herein collectively as "particulate migration"). More particularly, the present invention relates to the use of novel delayed tackifying compositions for reducing particulate migration in subterranean formations. While suitable for any subterranean application (such as those involving carbonates, sandstones, shales, coals, etc.), the compositions and methods of the present invention may be especially useful in coal bed methane ("CBM") subterranean applications.

Hydraulic fracturing is a process commonly used to increase the flow of desirable fluids from a portion of a subterranean formation. Traditional hydraulic fracturing operations comprise placing a fracturing fluid into a portion of a subterranean formation at a rate and pressure such that fractures are formed or enhanced into the portion of the subterranean zone. The fractures tend to propagate as vertical and/or horizontal cracks located radially outward from the well bore. In such treatments, once the hydraulic pressure is released, the fractures formed will tend to close back onto themselves. To prevent this, oftentimes particulate materials, known as proppant, are placed in the fractures by transporting them in the fracturing fluid during at least a portion of the fracturing operation. The particulates are carried into created or natural fractures and deposited therein such that when the hydraulic pressure is released the particulates act to prevent the fracture from fully closing, and thus, aid in forming conductive channels through which produced fluids may flow into the well bore. The term "propped fracture" as used herein refers to a fracture (natural or otherwise) in a portion of subterranean formation that contains some proppant particulates. The term "proppant pack" refers to a collection of a mass of proppant particulates within a fracture. Without the particulate materials, the fractures tend to close and reduce permeability gained by the fracturing operation.

Hydrocarbon wells are often located in subterranean zones that contain unconsolidated particulates (e.g., proppant and formation fines) that may migrate within the subterranean formation with the oil, gas, water, and/or other desirable fluids produced by a well. The presence of these unconsolidated particulates in produced fluids is disadvantageous and undesirable in that the particulates may abrade pumping and other producing equipment and reduce the fluid production capabilities of producing zones. The particulates also may impact negatively the permeability of the formation. Unconsolidated subterranean formations include those that contain portions that contain loose particulates (e.g., proppant and formation fines) and those wherein the bonded particulates have insufficient bond strength to withstand the forces produced by the production of fluids through the zones.

Controlling particulate migration in coal bed methane applications may be particularly important. "Coal bed methane" ("CBM") is the name usually given to methane found within coal seams. The amount of methane produced from a coal bed depends at least in part on the degree of permeability that is controlled by the amount of fracturing or cleats within the coal bed. CBM formations tend to have a naturally low permeability. These formations also are typically associated with low temperatures (e.g., less than 200° F.) and low reservoir pressures (e.g., less than 1000 psi bottom hole pressure). High capillary forces within the pore spaces tend to hold treatment fluids therein. Coal fines can be generated from the coal. These coal fines, or other particulates, can migrate and plug or partially plug the perforations, cleats, fractures, proppant, and/or producing zones.

One traditional method of controlling unconsolidated particulates in zones of a subterranean formation involves placing a filtration bed containing gravel particulates near the well bore that neighbors the zone of interest. The filtration bed acts as a sort of physical barrier to the transport of unconsolidated particulates to the well bore that could be produced with the produced fluids. Typically, such so-called "gravel packing operations" involve the pumping and placement of a quantity of desired particulates into the unconsolidated formation in an area adjacent the well bore. One common type of gravel packing operation involves placing a sand control screen in the well bore and packing the annulus between the screen and the well bore with gravel of a specific size designed to prevent the passage of formation sand. The sand control screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated particulates. The resulting structure presents a barrier to migrating sand from the formation while still permitting fluid flow. When installing the gravel pack, the gravel is carried to the annulus in the form of a slurry by mixing the gravel with a fluid, often known as a "gravel pack fluid." Sometimes gravel pack fluids are viscosified with suitable gelling agents. Once the gravel is placed in the well bore, the viscosity of the fluid is reduced, and it is returned to the surface. In some gravel packing operations, commonly known as "high rate water packing operations," the fluid has a lower viscosity and yet the gravel is transported because the treatment occurs at a high velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another method used to control particulates in unconsolidated formations involves consolidating unconsolidated portions of subterranean producing zones into relatively stable permeable masses by applying a resin followed by a spacer fluid and then a catalyst. Such methods may be problematic when, for example, an insufficient amount of spacer fluid is used between the application of the resin and the application of the external catalyst. In that case, the resin may come into contact with the external catalyst in the well bore itself rather than in the unconsolidated subterranean producing zone. Furthermore, there is uncertainty as to whether there is adequate contact between the resin and the catalyst. Additionally, when resin is contacted with an external catalyst an exothermic reaction occurs that may result in rapid polymerization, potentially damaging the formation by plugging the pore channels. Uniform placement of curable resin into the formations having long intervals is most desirable. However, formations often comprise a wide range of permeabilities even within a single reservoir located along a well bore. As a result, completions involving resin consolidation, with conventional diversion techniques, have been applied in intervals of less than 50 feet, and more ideally, less than 30 feet. Also, using resins to consolidate long or large unconsolidated zones may not be practical due, at least in part, to the high cost of most suitable resins.

Another similar method involves applying a non-aqueous tackifying composition to the unconsolidated particulates in an effort to reduce the migration of particulates within the zone. Whereas a curable resin composition produces a hard mass, the use of a non-aqueous tackifying composition produces a more malleable consolidated mass.

Another alternative is an aqueous tackifying composition. Aqueous tackifying compositions, however, have their own problems including, but not limited to, the fact that they require external activators and surfactants for optimum performance.

A new technique that could be useful is a fracturing treatment wherein the fracturing fluid comprises a suitable consolidation agent that reacts in such a way as to delayingly consolidate particulates within the formation to prevent particulate migration. This has heretofore not been accomplished, inter alia, because of the limitations associated with conventional acids and acid anhydride activators.

SUMMARY OF THE INVENTION

The present invention relates to methods and compositions for controlling particulate migration. More particularly, the present invention relates to the use of novel delayed tackifying compositions for controlling particulate migration in subterranean formations.

In one embodiment, the present invention provides a delayed tackifying composition for controlling particulate migration in subterranean formations comprising: an aqueous tackifying agent; and a delayed-acid releasing activator.

In another embodiment, the present invention provides a treatment fluid for use in subterranean formation for controlling particulate migration comprising an aqueous base fluid, and a delayed tackifying composition that comprises an aqueous tackifying agent and a delayed acid-releasing activator.

In another embodiment, the present invention provides a plurality of proppant particulates coated with a delayed tackifying composition that comprises an aqueous tackifying agent and a delayed acid-releasing activator.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for controlling particulate migration. More particularly, the present invention relates to the use of novel delayed tackifying compositions for controlling particulate migration in subterranean formations. The delayed tackifying compositions of the present invention may consolidate, stabilize, and/or control particulates (collectively referred to herein as "stabilizing" particulates and its derivatives) present in a subterranean formation (e.g., proppant, formation fines, and the like). This also may be referred to as "fines control." The compositions and methods of the present invention may be especially useful in CBM applications.

One of the many advantages of the present invention is that the methods eliminate the need for a separate acid activator when using aqueous tackifying agents, which improves the flexibility and control of the operation. Moreover, the methods of the present invention present a way to delayedly activate an aqueous tackifying agent downhole in a relatively controlled manner. Another advantage of the many advantages is that the resultant stabilized masses have better mechanical flexibility when compared to those formed with the use of curable resins. Other advantages will be evident to one skilled in the art with the benefit of this disclosure.

A. The Delayed Tackifying Compositions of the Present Invention

The delayed tackifying compositions of the present invention comprise an aqueous tackifying agent and an delayed acid-releasing activator for the aqueous tackifying agent. The delayed tackifying compositions also may comprise water; however, sufficient water may be present in the delayed tackifying composition as a result of the composition of the aqueous tackifying agent, which usually is in solution form. The delayed acid-releasing activator of the compositions produces an acid at a desired time after a delay period, which activates the aqueous tackifying agent, enabling it to stabilize particulates within a portion of a subterranean formation. The term "stabilize" and its derivatives as used herein means to make stable, lock in place, or at least partially immobilize the particulates in place such that they are resistant to flowing with produced fluids. This stabilization may be referred to as "fines control." The delay period depends on, inter alia, the nature of the delayed acid-releasing activator, the composition of the carrier fluid, and the environment in which they are placed.

Optionally, the delayed tackifying compositions of the present invention may comprise additional additives such as gelling agents, buffering agents, surfactants, breakers, enzymes, chelators, foam control agents, acids, or scale inhibitors. For instance, a buffer may be beneficial when a longer delay time is desired before the delayed acid-releasing activator produces an acid that is capable of activating the aqueous tackifying agent. Breakers and enzymes may be beneficial to get rid of any previous gel damage that may be present in the subterranean formation, for example, from a previous fracturing job. One of ordinary skill in the art with the benefit of this disclosure will recognize that the compatibility of any given additive should be tested to ensure that it does not adversely affect the performance of the tackifying agent.

1. Suitable Aqueous Tackifying Agents

Aqueous tackifying agents suitable for use in the present invention are capable of being "activated" (e.g., destabilized, coalesced and/or reacted) with the use of a suitable acid-based activator to transform the agent into an "activated aqueous tackifying agent" capable of stabilizing particulates at a desired time. An activated aqueous tackifying agent is capable of stabilizing particulates. Such activation may occur before, during, or after the aqueous tackifying agent is placed in the subterranean formation. One skilled in the art with the benefit of this disclosure will recognize that the desired delay in activation could be just minutes for the pump time required to place a treatment fluid mixed on-the-fly to days for a treatment fluid that is prepared off-site and then transported to the well. In preferred embodiments of the present invention, the activation occurs after a delay period, which may range from about 15 minutes to about 75 hours or more. A preferred delay period ranges from about 1 to about 12 hours.

Suitable aqueous tackifying agents are generally charged polymers that comprise compounds that, when in an aqueous solvent or solution, will form a non-hardening coating with an activator and, when placed on particulates in a formation, will increase the continuous critical re-suspension velocity of the particulate when contacted by a stream of water. The critical re-suspension velocity refers to that velocity at the transitional point between laminar and turbulent types of fluid flow. The aqueous tackifying agent may enhance the grain-to-grain contact between the particulates within the formation (be they proppant particulates, formation fines, or other particulates), helping bring about the consolidation of the particulates into a cohesive, flexible, and permeable mass (referred to herein as a "stabilized mass"), stabilize individual particulates or clusters of particulates, or reduce the tendency of particulates to form into an optimum packing arrangement (e.g., for higher porosity or permeability).

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in U.S. patent application Ser. No. 10/864,061, filed Jun. 9, 2004 and U.S. patent application Ser. No. 10/864,618, filed Jun. 9, 2004 the relevant disclosures of which are hereby incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

Typically, most suitable aqueous tackifying agents are solution-based polymers; they are usually available in about 20% to 40% concentrations. In some embodiments, the aqueous tackifying agent is about a 40% solution in water, with other small amounts of surfactants or other additives. One skilled in the art with the benefit of this disclosure will envision readily dried polymer compositions as well as diluted compositions (e.g., polymer concentrations of less than about 20%).

The aqueous tackifying agent should be included in a delayed tackifying composition of the present invention in an amount of from about 0.01% to about 10% of the volume of a delayed aqueous tackifying composition. In preferred embodiments, this amount may range from about 0.1% to about 5%.

2. Suitable Delayed Acid-Releasing Activators

In the methods of the present invention, a delayed acid-releasing activator produces enough acid over time to activate the aqueous tackifying agent and, thus, cause the aqueous tackifying agent to become tacky so that it can stabilize particulates downhole. Thus, there is no requirement for an external acid solution to activate the aqueous tackifying agent.

Nonlimiting examples of delayed acid-releasing acid activators that may be used in conjunction with the present invention include, but are not limited to, orthoesters, poly(orthoesters), degradable polymers, and other acid precursors (such as encapsulated acids) that release an acid upon degradation. The amount of delayed acid-releasing activator needed to activate the aqueous tackifying agent is stoichiometrically related to the amount of the aqueous tackifying agent present.

a. Suitable Orthoesters and Poly(orthoesters)

Orthoesters and poly(orthoesters) suitable for use in the present invention will generate acids in a delayed fashion that, inter alia, will activate the aqueous tackifying agent.

Examples of suitable orthoesters have a structure defined by the formula: RC(OR')(OR")(OR'''), wherein R', R", and R''' are not hydrogen and R', R", and R''' may or may not be the same group. R', R", or R''' may comprise a heteroatom that may affect the solubility of the chosen orthoester in a given application. Suitable heteroatoms could include nitrogen or oxygen. Suitable poly(orthoesters) are described in an article entitled, *Poly(orthoesters)—From Concept to Reality*, BIOMACROMOLECULES, Vol 5, 1625 (2004), and some of the references cited therein, which is incorporated herein by reference. Examples of suitable orthoesters and poly(orthoesters) include, but are not limited to, orthoacetates, such as trimethyl orthoacetate, triethyl orthoacetate, tripropyl orthoacetate, triisopropyl orthoacetate, tributyl orthoacetate, and poly(orthoacetates); orthoformates, such as trimethyl orthoformate, triethyl orthoformate, tripropyl orthoformate, triisopropyl orthoformate, tributyl orthoformate, and poly(orthoformates); and orthopropionates, such as trimethyl orthopropionate, triethyl orthopropionate, tripropyl orthopropionate, triisopropyl orthopropionate, tributyl orthopropionate, and poly(orthopropionates). Suitable orthoesters also may be orthoesters of polyfunctional alcohols, such as glycerin and/or ethylene glycol. In choosing an orthoester, one should be mindful that some orthoesters have low flash points. Various derivatives can be synthesized by transesterification of the above mentioned orthoesters with variety of alcohols, sugars, or polyols. One should be mindful that to synthesize these molecules, there should not be any free alcohol groups left after the synthesis, which can further transesterify and possibly break the molecule. Depending on the desired application, the orthoesters or the poly(orthoesters) may be water soluble, water insoluble, or solid. Generally speaking, water soluble orthoesters are easy to hydrolyze at lower temperature in comparison to water insoluble orthoesters. By making an orthoester or a poly(orthoester) more hydrophobic (e.g., through appropriate derivatization techniques), the orthoester may be more suitable for use in higher temperature applications. Also, poly(orthoesters) made by glycerol and trimethyl orthoformate are water soluble depending on the number of repeating units and can be used for lower temperature applications. One of the advantages of having a poly(orthoester) over an orthoester is that it has a higher flash point and a higher viscosity. Similarly, hydrophobic poly(orthoesters) may be synthesized, which are suitable for higher temperature applications. The choice of which particular orthoester or poly(orthoester) to use should be guided by such considerations as environmental factors.

To allow the orthoester or poly(orthoester) to hydrolyze to produce an acid, a source of water may be needed. The water should be present in an amount from about 2 moles of water for about every 1 mole of orthoester to an excess of water. For poly(orthoesters), this is based upon the moles of the orthoester repeating units available for reaction. One of ordinary skill in the art with the benefit of this disclosure will recognize whether a suitable amount of water is present in either the delayed acid-releasing activator or otherwise in the well bore for a desired application or whether an aqueous fluid should be added.

The delayed tackifying agent compositions of the present invention also may comprise an inhibitor, which may delay the generation of the acid from the orthoester or poly(orthoester), and also may neutralize the generated acid during the delay period to encourage a longer delay. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred.

A suitable orthoester or poly(orthoester) can have any suitable form. For instance, they can be used in a solid form, solution form, a gel form, or an emulsion form. In certain applications, a solution form may be useful, e.g., when a faster activation of the aqueous tackifying agent is desired; in other applications, e.g., when a slower activation is desirable, a solid, a gel, or an emulsion form may be used. For the solution form, suitable exemplary solvents include, but are not limited to, propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla. One of ordinary skill in the art with the benefit of this disclosure will recognize the appropriate formulation for a particular application.

The generated acid also may act as a breaker for a viscosified treatment fluid, such as a fracturing or gravel pack fluid.

b. Suitable Degradable Polymers

Suitable degradable polymers include those that will release an acid upon degradation (e.g., through chemical hydrolysis). A polymer is considered to be "degradable" herein if the degradation is due, inter alia, to chemical and/or radical process such as hydrolysis or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that release an acid upon degradation that may be used in accordance with the present invention include, but are not limited to, aliphatic polyesters; poly(lactides); poly(glycolides); poly(ϵ-caprolactones); poly(hydroxybutyrates); poly(anhydrides); and aliphatic polycarbonates. A preferred acid precursor is one that produces acetic acid with poly(acrylate ester) aqueous tackifying agents. Acid precursors that produce acetates such as ethyl orthoacetate may be preferred with other aqueous tackifying agents.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyper-branched polymers, star-shaped, or dendrimers, etc.). The properties of any such suitable delayed acid-releasing degradable material (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Blends of certain delayed acid-releasing degradable materials may also be suitable. One example of a suitable blend of materials includes a blend of poly(lactic acid) and poly(glycolide). Other materials that undergo degradation and produce acid may also be suitable, if the products of the degradation do not undesirably interfere with either the subterranean treatment being performed or the subterranean formation.

In choosing the appropriate activator, one should consider the degradation products that will result. Also, these degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and poly(lactide) have been found to be suitable for well bore temperatures above this range. Also, poly(lactic acid) may be suitable for higher temperature wells.

When used in the present invention, a preferable result is achieved if the delayed acid-releasing activator produces an acid after a delay period as opposed to instantaneously. Even more preferable results have been obtained when the acid is not released until after the subterranean treatment has been substantially completed and it is desirable for the treatment fluid to convert to a lower viscosity fluid.

c. Other Acid Precursors

Other delayed acid-release activators that may be used in conjunction with the present invention includes those materials whose thermal degradation or reaction products include acids. Examples include, but are not limited to, esters, lactones, lactic anhydride, maleic anhydride, and encapsulated acids.

B. Treatment Fluids that Comprise the Delayed Tackifying Compositions of the Present Invention Because of their delayed nature, the delayed tackifying compositions of the present invention may be used in conjunction with any suitable subterranean treatment fluid (e.g., a fracturing fluid). As used herein, the term "treatment," or "treating," refers to any subterranean operation that uses a fluid in conjunction with a desired function and/or for a desired purpose. The term "treatment," or "treating," does not imply any particular action by the fluid or any particular component thereof. In one embodiment, a delayed tackifying composition of the present invention may be added to a fracturing fluid and then placed downhole with the fracturing fluid during the fracturing operation. The delayed acid-releasing activator will produce an acid at a desired time after the fracturing fluid is placed into a desired portion of the subterranean formation. The acid can act as a breaker for the fracturing fluid as well as an activator for the delayed tackifying agent of the delayed tackifying composition. Another example is a gravel pack fluid. A delayed tackifying composition of the present invention may be added to a gravel pack fluid and introduced to a subterranean formation with the fluid. The acid can act as a breaker for the gravel pack fluid (e.g., if the gravel pack fluid is viscosified with a suitable gelling agent) as well as an activator for the delayed tackifying agent of the delayed tackifying composition. Other treatments in which a delayed tackifying composition of the present invention may be introduced into a subterranean formation include remedial or matrix treatments.

Suitable aqueous treatment fluids include fresh water, salt water, brine, seawater, or any other aqueous liquid that does not adversely react with the other components used in accordance with this invention or with the subterranean formation. One should note that if the treatment fluid comprises a large concentration of salts, then those salts may act as an activator for the aqueous tackifying agent, which may not be desirable.

In some embodiments, the treatment fluid may be foamed. One advantage of using a foamed version over a nonfoamed version is that less aqueous fluid is used, relatively speaking. This may be important in subterranean formations that are water-sensitive. In some embodiments, the foamed treatment fluids have a foam quality of about 30% or above. A preferred foam quality level is about 50% or above. These may include commingled fluids. In such embodiments, the treatment fluid comprises a foaming agent and optionally a suitable surfactant.

The choice of whether to use a surfactant will be governed at least in part by the mineralogy of the formation. Generally speaking, a surfactant may help facilitate the coating of the particulates by the delayed tackifying composition. For instance, the aqueous tackifying agents used in this invention comprise charged polymers that preferentially attached to particles having an opposite charge. For example, a hydrophobic polymer having a negative charge will preferentially attach to surfaces having a positive to neutral zeta potential and/or a hydrophillic surface. Therefore, in particular embodiments, a cationic surfactant may be included to facilitate application of the aqueous tackifying agent to particulates within the formation. As will be understood by those skilled in the art, amphoteric and zwitterionic surfactants also may be used so long as the conditions they are exposed to during use are such that they display the desired charge. For example, in particular embodiments, mixtures of cationic and amphoteric surfactants may be used. When used in treatment fluid embodiments, the surfactant is present in an amount of from about 0.01% to about 5% by volume. When foamed, the base fluid and/or the delayed tackifying composition may comprise a gas. While various gases can be utilized for foaming the treatment fluids of this invention, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80%. The amount of gas to incorporate into the fluid may be affected by factors including the viscosity of the fluid and bottom hole pressures involved in a particular application. Examples of preferred foaming agents that can be utilized to foam the base fluid and/or the delayed tackifying composition of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Cocoamidopropyl betaine is especially preferred. Other suitable surfactants available from Halliburton Energy Services include: "19N™," "G-Sperse Dispersant," "Morflo III®" surfactant, "Hyflo® IV M" surfactant, "Pen-88™" surfactant, "HC-2™ Agent," "Pen-88 HT™" surfactant, "SEM-7™ " emulsifier, "Howco-Sud™" foaming agent, "Howco Sticks™" surfactant, "A-Sperse™" Dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in a base fluid and/or a delayed tackifying composition of the present invention in an amount in the range of from about 0.01% to about 5.0% by volume, more preferably in the amount of from about 0.2% to about 1.0% and most preferably about 0.6% by volume.

Optionally, the treatment fluid may comprise a gelling agent. Any gelling agent suitable for use in subterranean applications may be used in these compositions, including, but not limited to, natural biopolymers, synthetic polymers, crosslinked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the delayed tackifying compositions of the present invention in an amount in the range of from about 0.1% to about 5% by weight of the water therein. In certain exemplary embodiments, the gelling agents are present in the delayed tackifying compositions of the present invention in an amount in the range of from about 0.01% to about 2% by volume. If a gelling agent is used, a suitable breaker may be necessary to ultimately reduce the viscosity of the fluid. Any breaker suitable for the subterranean formation and the gelling agent may be used. The amount of a breaker to include will depend, inter alia, on the amount of gelling agent present in the treatment fluid. Other considerations regarding the breaker are known to one skilled in the art with the benefit of this disclosure.

C. The Methods of the Present Invention

The delayed tackifying compositions of the present invention may be used, inter alia, in any suitable well treatment in which it is desirable to control particulates in a delayed fashion. One example of a method of the present invention comprises the steps of: providing a treatment fluid that comprises a delayed tackifying composition of the present invention that comprises an aqueous tackifying agent and an delayed acid-releasing activator; placing the treatment fluid in a subterranean formation; allowing the acid precursor to produce an acid after a delay period; and allowing the acid to activate the aqueous tackifying agent to form an activated aqueous tackifying agent that is capable of stabilizing particulates.

In some embodiments, the present invention provides a method of treating a portion of a subterranean formation that comprises: providing a delayed tackifying composition that comprises an aqueous tackifying agent and an delayed acid-releasing activator; introducing the delayed tackifying composition to a chosen portion of a subterranean formation; allowing the delayed acid-releasing activator to produce an acid that is capable of activating the aqueous tackifying agent; allowing the aqueous tackifying agent to be activated so as to form an activated aqueous tackifying agent; and allowing the activated aqueous tackifying agent to adhere to unconsolidated particulates within the portion of the subterranean formation. These methods can be performed at any time during the life of the well.

Certain methods of the present invention are directed to methods that allow placement of the tackifying agents deeper into a formation before activation of the tackifying agent.

In some embodiments, the delayed tackifying compositions of the present invention may be used, inter alia, in primary, remedial, or proactive methods. Whether a particular method of this invention is "primary," "remedial," or "proactive" is determined relative to the timing of a fracturing treatment or a gravel packing treatment. The primary methods of the present invention involve using a delayed tackifying composition of the present invention in conjunction with a fracturing fluid or a gravel pack fluid (e.g., as a component of the fracturing fluid or a gravel pack fluid so that the delayed tackifying composition is introduced into the subterranean formation with the fluid). The remedial methods are most suited for wells wherein a portion of the well has been fractured and propped. The remedial methods also may be used in a gravel packing situation, for example where there has been a screen problem or failure. The proactive methods are most suited for wells that have not yet been fractured or gravel packed. The proactive methods can be performed in conjunction with a fracturing treatment, for example, as a pre-pad to the fracturing treatment or in any diagnostic pumping stage performed before the main fracturing, gravel packing, or acidizing procedure, if desired.

The delayed tackifying compositions of the present invention also may be used before, during, or after in a fracture acidizing or a matrix acidizing process. This is possible because the aqueous tackifying agent is not activated by the HCl used in such acidizing procedures.

One of ordinary skill in the art will recognize that the present invention may be useful to stabilize other types of particulates, such as the coatings (also referred to as "grape-skin") left over from some encapsulated materials.

The methods of the present invention are especially suitable for CBM applications, wherein it is desirable to control the large volume of formation fines that are usually present in such formations. If left untreated, these fines can lower the production of a well to the point where it might not be economically viable. By treating these fines in accordance with the present invention, the production decline curve of these wells may be improved.

Below are some additional examples of some of the primary, remedial, and proactive methods of the present invention.

1. Primary Methods

In some embodiments, a delayed tackifying composition of the present invention may be used in a primary method with a well treatment fluid, such as a fracturing fluid or a gravel pack fluid. One example of such a method comprises: providing a fracturing fluid that comprises a delayed tackifying composition of the present invention; placing the fracturing fluid into a portion of the subterranean formation at a pressure sufficient to create or enhance a fracture therein; and allowing the delayed tackifying composition to consolidate particulates within the portion of the subterranean formation. Another embodiment of a primary method of the present invention comprises the steps of: providing a fracturing fluid comprising a delayed tackifying composition that comprises an aqueous tackifying agent and an delayed acid-releasing activator; placing the fracturing fluid into a portion of the subterranean formation at a pressure sufficient to create or enhance a fracture therein; allowing the delayed acid-releasing activator to produce an acid that is capable of activating the aqueous tackifying agent; activating the aqueous tackifying agent to form an activated aqueous tackifying agent; and allowing the activated aqueous tackifying agent to adhere to a surface and/or unconsolidated particulates within the portion of the subterranean formation. As recognized by one of ordinary skill in the art, while usually preferred, the aqueous tackifying agent and delayed acid-releasing activator are not required to be in the same fluid or stage of the treatment.

The fracturing fluids in these primary embodiments may comprise those things usually found in fracturing fluids including, but not limited to, an aqueous base fluid, proppant particulates, gelling agents, surfactants, breakers, buffers, a gas phase (if the fracturing fluid is foamed or commingled), coupling agents, and the like.

One example of a primary gravel pack method of the present invention comprises: providing a gravel pack fluid that comprises gravel, a brine, optionally a gelling agent, and a delayed tackifying composition, the delayed tackifying composition comprising an aqueous tackifying agent and an delayed acid-releasing activator; contacting the portion of the subterranean formation with the gravel pack fluid so as to place a gravel pack in or near a portion of the subterranean formation; allowing the delayed acid-releasing activator to produce an acid that is capable of activating the aqueous tackifying agent; allowing the aqueous tackifying agent to be activated so as to form an activated aqueous tackifying agent; and allowing the activated aqueous tackifying agent to stabilize particulates within the subterranean formation. The gravel pack fluids used in these embodiments may be any suitable gravel pack fluid, and it may comprise those things usually found in gravel pack fluids including, but not limited to, an aqueous base fluid, gravel particulates, gelling agents, surfactants, breakers, buffers, a gas phase (if the fluid is foamed or commingled), and the like.

One should note that the delayed acid-releasing activator may act as a breaker for or enhance the breaking of the fracturing fluid or the gravel pack fluid (e.g., if the gravel pack fluid is viscosified) in that it may help reduce the viscosity of the fracturing fluid or the gravel pack fluid. The acid also may be helpful in cleaning up near well bore formation damage. One should also note that the delayed tackifying compositions of the present invention allow the use of aqueous tackifying agents in fracturing fluids or gravel pack fluids without impairing the quality of the gel.

2. Remedial Methods

In some remedial embodiments of the present invention, after a fracturing treatment or a gravel pack treatment has been performed, a delayed tackifying composition of the present invention may be introduced into an unconsolidated zone of a subterranean formation to stabilize particulates within the zone. In such embodiments, it may be desirable to include a breaker or an enzyme in the delayed tackifying composition to interact with any undesirable gel residue that may be present. The delayed tackifying composition may disperse any loose fines within a proppant pack in a fracture, move any fines away from the fracture (or near well bore), stabilize gravel particulates around a screen, stabilize a screen failure, and lock the fines in the formation without causing damage to the permeability of the formation.

In some embodiments, the delayed tackifying composition that comprises an aqueous tackifying agent and an delayed acid-releasing activator will be placed into at least one propped fracture within an unconsolidated zone of a subterranean formation. The delayed acid-releasing activator will produce an acid that activates the aqueous tackifying agent in the delayed tackifying composition. The activated aqueous tackifying agent will stabilize loose particulates in the fracture. In the remedial embodiments, the delayed tackifying compositions of the present invention may be introduced to the subterranean formation with any suitable base fluid. Suitable aqueous base fluids include fresh water, salt water, brine, seawater, or any other aqueous liquid that does not adversely react with the other components used in accordance with this invention or with the subterranean formation. One should note that if the aqueous base fluid comprises a large concentration of salts, then those salts may act as an activator for the aqueous tackifying agent, which may not be desirable. As recognized by one of ordinary skill in the art, while usually preferred, the aqueous tackifying agent and delayed acid-releasing activator are not required to be in the same fluid or stage of the treatment.

3. The Proactive Methods

The proactive methods of the present invention are most suited for wells that have not been fractured or gravel packed yet. These methods can be used as a pre-treatment before a fracturing treatment or at the early stage of a fracturing treatment (including diagnostic pumping) as a pre-pad treatment.

In some embodiments, the proactive methods of the present invention comprise placing a delayed tackifying composition before or as part of a pre-pad of a fracturing treatment into a subterranean formation. The second step involves fracturing a portion of the subterranean formation. This fracturing step may include the introduction of some proppant into the formation. This proppant may be coated, uncoated, or a combination thereof (i.e., some coated, then some uncoated, and so on). In some embodiments, from an economic point of view, it is preferable to introduce the coated proppant at the end of the fracturing treatment. The third step involves introducing proppant during the fracturing treatment into the fractures created in the fracturing treatment. The proppant may form proppant packs in the fractures. All three steps may be performed with a single fluid. As recognized by one of ordinary skill in the art, while usually preferred, the aqueous tackifying agent and delayed acid-releasing activator are not required to be in the same fluid or stage of the treatment.

4. Introducing Coated Proppant.

In some embodiments, the delayed tackifying compositions of the present invention may be coated on proppant to be used in a fracturing or gravel packing process like those described above. The resultant coated proppant may be introduced as part of a fracturing or gravel packing process, at any point during one of the methods described above. Preferably, the coated proppant is introduced towards the end of a fracturing or gravel packing treatment so that the maximum economic benefit can be obtained. The term "coated proppant" as used herein means proppant particulates that have been at least partially coated with a delayed tackifying composition of the present invention or a component thereof. The proppant particulates may be coated by any suitable method as recognized by one skilled in the art with the benefit of this disclosure. The term "coated" does not imply any particular degree of coverage of the proppant particulates with a delayed tackifying composition.

A wide variety of particulate materials may be used as proppant in accordance with the present invention, including, but not limited to, sand; bauxite; ceramic materials; glass materials; resin precoated proppant (e.g., commercially available from Borden Chemicals and Santrol, for example, both from Houston, Tex.); polymer materials; "TEFLON™" (tetrafluoroethylene) materials; nut shells; ground or crushed nut shells; seed shells; ground or crushed seed shells; fruit pit pieces; ground or crushed fruit pits; processed wood; composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. The proppant used may have a particle size in the range of from about 2 to about 400 mesh, U.S. Sieve Series. Preferably, the proppant is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the proppant.

To facilitate a better understanding of the present invention, the following examples of certain aspects of some embodiments are given. In no way should the following examples be read to limit, or define, the scope of the invention.

EXAMPLES

To 5 ml of a 40% solution of poly(acrylate ester) polymer in water (buffered to a pH of about 9 with $NaHCO_3$) was added to 5 ml ethyl orthoacetate for a total volume of 100 ml. Next, 10 g activated carbon (simulated coal fines) was added. Flocculation did not occur. Upon lowering the pH with a nonactivating 3% HCl solution to near neutral, the orthoester hydrolyzed, releasing acetic acid that activated the poly(acrylate ester) polymer, which consolidated the coal.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A plurality of proppant particulates coated with a delayed tackifying composition that comprises an aqueous tackifying agent and a delayed acid-releasing activator capable of activating the aqueous tackifying agent, the delayed-acid releasing activator comprising at least one material selected from the group consisting of an orthoacetate; trimethyl orthoacetate; triethyl orthoacetate; tripropyl orthoacetate; triisopropyl orthoacetate; tributyl orthoacetate; a poly(orthoacetate); an orthoformate; trimethyl orthoformate; triethyl orthoformate; tripropyl orthoformate; triisopropyl orthoformate; tributyl orthoformate; a poly(orthoformate); a orthopropionate; trimethyl orthopropionate; triethyl orthopropionate; tripropyl orthopropionate; triisopropyl orthopropionate; tributyl orthopropionate; a poly(orthopropionate); and an orthoester of a polyfunctional alcohol.

2. The proppant particulates of claim 1 wherein at least one of the proppant particulates is selected from the group consisting of: sand; bauxite; ceramic materials; glass materials; resin precoated proppant; polymer materials; tetrafluoroethylene materials; nut shells; nut shell pieces; fruit pit pieces; processed wood particles; composite particulates prepared from a binder with a filler particulate; silica; alumina; fumed carbon; carbon black; graphite; mica; titanium dioxide; metasilicate; calcium silicate; kaolin; talc; zirconia; boron; fly ash; hollow glass microspheres; and mixtures thereof.

3. The proppant particulates of claim 1 wherein the aqueous tackifying agent is selected from the group consisting of: an acrylic acid polymer; an acrylic acid ester polymer; an acrylic acid derivative polymer; an acrylic acid homopolymer; an acrylic acid ester homopolymer; poly(methyl acrylate); poly (butyl acrylate); poly(2-ethylhexyl acrylate); an acrylic acid ester co-polymer; a methacrylic acid derivative polymer; a methacrylic acid homopolymer; a methacrylic acid ester homopolymer; poly(methyl methacrylate); poly (butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; an acrylic acid/acrylamido-methyl-propane sulfonate co-polymer; benzyl coco di-(hydroxyethyl) quaternary amine; p-T-amyl-phenol condensed with formaldehyde; a copolymer comprising from about 80% to about 100% $C_{1-30}$ alkylmethacrylate monomers and from about 0% to about 20% hydrophillic monomers; and any combination thereof.

4. A treatment fluid for use in subterranean formation for controlling particulate migration comprising an aqueous base fluid, and a plurality of proppant particulates coated with a delayed tackifying composition, the delayed tackifying composition comprising an aqueous tackifying agent and a delayed acid-releasing activator capable of activating the aqueous tackifying agent, wherein the delayed-acid releasing activator comprises at least one material selected from the group consisting of: an orthoacetate; trimethyl orthoacetate; triethyl orthoacetate; tripropyl orthoacetate; triisopropyl orthoacetate; tributyl orthoacetate; a poly(orthoacetate); an orthoformate; trimethyl orthoformate; triethyl orthoformate; tripropyl orthoformate; triisopropyl orthoformate; tributyl orthoformate; a poly(orthoformate); a orthopropionate; trimethyl orthopropionate; triethyl orthopropionate; tripropyl orthopropionate; triisopropyl orthopropionate; tributyl orthopropionate; a poly(orthopropionate); and an orthoester of a polyfunctional alcohol.

5. The treatment fluid of claim 4 wherein the treatment fluid is a fracturing fluid or a gravel pack fluid.

6. The treatment fluid of claim 4 wherein the treatment fluid is a foamed treatment fluid.

7. The treatment fluid of claim 4 wherein the treatment fluid comprises a component selected from the group consisting of: fresh water; salt water; brines; seawater; a foaming agent; an alkylamidobetaine; cocoamidopropyl betaine; alpha-olefin sulfonate; trimethyltallowammonium chloride; $C_8$ to $C_{22}$ alkylethoxylate sulfate; trimethylcocoammonium chloride; a gelling agent; a natural biopolymer; a synthetic polymer; a crosslinked gelling agent; a viscoelastic surfactant; guar; xanthan; a polysaccharide; a depolymerized gelling agent; and a breaker.

8. The treatment fluid of claim 4 wherein the treatment fluid comprises a delayed tackifying composition that comprises an additive selected from the group consisting of: a gelling agent; a buffering agent; a surfactant; a breaker; an enzyme; a chelator; a foam control agent; an acid; an inhibitor; and a scale inhibitor.

9. The treatment fluid of claim 4 wherein the treatment fluid comprises an aqueous tackifying agent that comprises a polymer that can bind, coagulate, or flocculate a particulate in a subterranean formation.

10. The treatment fluid of claim 4 wherein the treatment fluid comprises an aqueous tackifying agent that is selected from the group consisting of: an acrylic acid polymer; an acrylic acid ester polymer; an acrylic acid derivative polymer; an acrylic acid homopolymer; an acrylic acid ester homopolymer; poly(methyl acrylate); poly (butyl acrylate); poly(2-ethylhexyl acrylate); an acrylic acid ester co-polymer; a methacrylic acid derivative polymer; a methacrylic acid homopolymer; a methacrylic acid ester homopolymer; poly (methyl methacrylate); poly(butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; an acrylic acid/acrylamido-methyl-propane sulfonate co-polymer; any derivative thereof; and any combination thereof.

11. The treatment fluid of claim 4 wherein the treatment fluid comprises an aqueous tackifying agent that is selected from the group consisting of: benzyl coco di-(hydroxyethyl) quaternary amine; p-T-amyl-phenol condensed with formaldehyde; and a copolymer comprising from about 80% to about 100% $C_{1-30}$ alkylmethacrylate monomers and from about 0% to about 20% hydrophillic monomers.

12. The treatment fluid of claim 4 wherein the treatment fluid comprises an aqueous tackifying agent that comprises from about 0.01% to about 10% of the delayed tackifying composition.

* * * * *

UNITED STATES PATENT AND TRADEMARK OFFICE
CERTIFICATE OF CORRECTION

PATENT NO.       : 7,595,280 B2                                    Page 1 of 1
APPLICATION NO.  : 11/205333
DATED            : September 29, 2009
INVENTOR(S)      : Welton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Twenty-eighth Day of September, 2010

David J. Kappos
*Director of the United States Patent and Trademark Office*